MELVIN H. MURPHY
INVENTOR.

BY
ATTORNEYS

United States Patent Office 2,889,515
Patented June 2, 1959

2,889,515

DELAY LINE TEST MEANS AND TECHNIQUES

Melvin H. Murphy, Encino, Calif., assignor to Brubaker Electronics, Inc., Los Angeles, Calif., a corporation of California Application August 15, 1955, Serial No. 528,408

2 Claims. (Cl. 324—57)

The present invention relates to improved means and techniques for measuring time delays in pulsed electrical systems such as radar systems, and is related also to improved means and techniques for measuring characteristics of pulses such as rise time, pulse duration and decay time.

In general, the apparatus described herein for practicing the present invention involves a crystal controlled time mark generator for producing oscillations of approximately 10 megacycles. A first frequency dividing means is coupled to the generator for producing oscillations of approximately one megacycle, and second frequency dividing means coupled to the first frequency dividing means for producing oscillations of approximately 10,000 cycles. Markers are produced on the face of a cathode ray oscillograph in accordance with such oscillations of 10 megacycles and such oscillations of one megacycle. A test pulse is derived from the 10,000 cycle oscillations in a test pulse channel which incorporates variable delay means, and the output of the test pulse channel is applied to a delay line under test. The pulse appearing at either the input terminal of the delay line or at the output terminal of the delay line may be selectively applied to the deflection circuit of the oscillograph. The 10,000 cycle oscillations are applied also to a synch pulse channel for deriving therefrom a synch pulse that is applied to the sweep synchronizing circuit of the oscillograph. Such synch pulse channel incorporates two independently adjustable delay means whereby the developed synch pulse may be applied with different amounts of delay to the synch circuit of the oscillograph.

It is, therefore, a general object of the present invention to provide improved apparatus of the character outlined above for achieving the above-indicated results.

A specific object of the present invention is to provide improved apparatus for making measurements of time intervals to within a few milli-microseconds.

Another specific object of the present invention is to provide improved means and techniques for measuring characteristics of a pulse.

Another specific object of the present invention is to provide means and techniques whereby apparatus such as delay lines may be tested accurately with respect to the delay imposed by such apparatus.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 5 is a view of the knob and dial.

Figure 1:
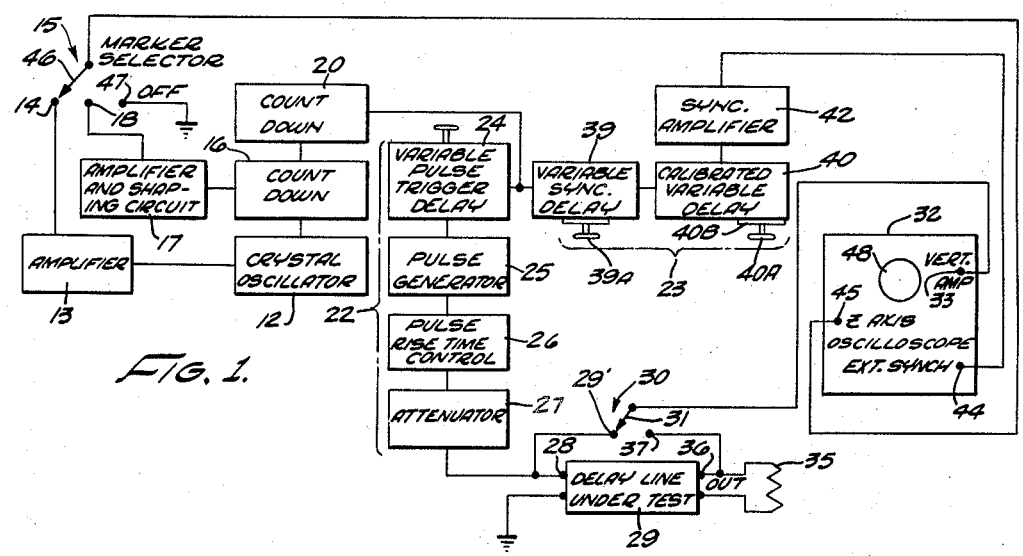
Figure 1 is a block diagram representing apparatus used in achieving features of the present invention.

The apparatus shown in Figure 1 incorporates a 10 megacycle crystal controlled oscillator 12, and the output of the oscillator after amplification in the amplifier stage 13 is applied to the stationary contact 14 of the marker selector switch 15. The output of the oscillator 12 is applied also to a frequency dividing network 16 in the form of a count down multivibrator which serves to reduce the oscillations by a factor of 10 to one megacycle. The output of the stage 16 after amplification and shaping in the one megacycle amplifier and shaping circuit 17 is applied to a second stationary contact 18 of the switch 15. The output of the stage 16 is also applied to a second frequency dividing network 20 in the form of a count down multivibrator which serves to reduce the oscillations by a factor of 100 so that the output of the stage 20 comprises oscillations of 10,000 cycles per second.

The output of the stage 20 is applied to two different channels, namely a so-called test pulse channel 22 and a synch pulse channel 23.

The first stage in the channel 22, to which the 10,000 kilocycle oscillations are applied, comprises a variable pulse trigger delay network 24 which may be in the form of a phantastron circuit having a continuously variable device such as a pair of resistances for effecting a fine and a coarse control of the delay over a range of zero to 50 microseconds.

The output of the network 24 is applied to a pulse generator 25 which may be in the form of a blocking oscillator, and the output pulse of the stage 25, after being shaped and suitably attenuated in the so-called pulse rise time control circuit 26 and the attenuator 27, is applied to the ungrounded terminal 28 of the apparatus 29 under test. The apparatus 29 may, for example, be a delay line whose delay characteristics are to be measured. The terminal 28 is connected to a stationary contact 29 of a selector switch 30 having its movable arm 31 connected to cathode beam deflecting means of the cathode ray tube oscillograph 32 via the input terminal 33 designated as vertical amplifier. The output terminals of the apparatus 29 are connected to a suitable terminating impedance 35, and one output terminal 36 of the apparatus 29 is connected to the other stationary contact 37 of switch 30 whereby either the pulse appearing at the input of the delay line 29 or the pulse appearing at the output of the delay line may be selectively applied to the beam deflecting means of the oscillograph 32.

The first stage in the synch pulse channel 23 is the so-called variable synch delay network 39 which also may be in the form of a phantastron network for imposing a variable delay. Such delay, in the case of phantastron circuits, as is well known, may be controlled by adjustment of one or more resistances in the network. The network 39 thus is deemed to incorporate a first means for imposing a variable delay. The output of the network 39 is applied to the so-called calibrated delay network 40 which may comprise simply a continuously variable delay line that is accurately calibrated, and such network 40 is deemed to be a second means for delaying the synch pulse which is ultimately applied to the sweep synchronizing circuit of the oscillograph 32. The delay means in the networks 39 and 40 are independently adjustable and, functioning together, are effective to impose a delay in the pulses transmitted through the channel 23 in a range extending from zero to 50 microseconds.

The output of the network 40, after amplification in the synch amplifier stage 42, is applied to the sweep synchronizing circuit of the oscillograph 32 via the input terminal designated as the external synch terminal 44.

Marker pulses are supplied to the oscillograph 32 via the terminal 45, designated as Z axis, through the above-mentioned switch 15 having the movable contact 46 selectively engageable with the stationary contacts 14, 18 and 47, the latter contact being grounded. The terminal 45 is connected to an intensity control electrode of the cathode ray tube 48 of the oscillograph 32.

Figure 2:
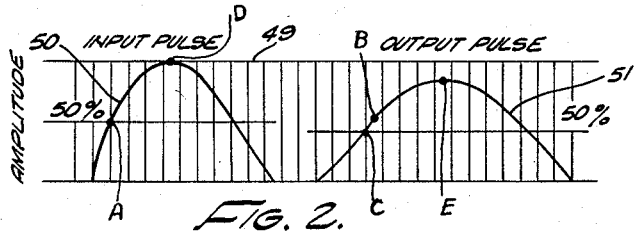
Figure 2 shows a type of presentation on the face of the cathode ray tube using the apparatus illustrated in Figure 1 and also indicates three individual time measurements which may be made on the same delay line under test.

The oscillograph 32 has an accurately scribed graticule 49, as indicated in Figure 2.

All of the above described apparatus, except the oscillograph 32, may be conveniently combined into one unit.

The pulses observable on the face of the cathode ray tube, when the switch arm 31 is respectively engageable with the contacts 29 and 37, are correspondingly shown as the input pulse 50 and the output pulse 51 in Figure 2, such pulses being time spaced, the output pulse being delayed with respect to the input pulse.

As indicated above, the variable delay network 40, in the form of a calibrated delay line, may be checked using the following procedure which involves observing the zero and the 0.1 microsecond points on the calibrated dial 40B which is associated with the network 40. With such dial 40B set at zero, with reference to the stationary pointer or indicia mark 40C, the synch pulse is delayed by adjusting the variable element in the network 39, using control knob 39A, until a 0.1 microsecond marker lines up with any vertical reference line on the oscillograph screen 49.

Thereafter, the calibrated delay dial 40B associated with the delay network 40 is adjusted, using the control knob 40A, until the next 0.1 microsecond marker is exactly lined up with the same reference line on the graticule. This point on the dial 40B of the variable element associated with the network 40 is marked. If the calibrated delay network 40 is a linear device, it is only necessary to divide the dial into ten equal divisions so that each one of these divisions represents ten milli-microseconds.

In measuring the delay between pulses, it is noted that all pulses have rise and decay times. If all pulses were ideal pulses having instantaneous rise and decay times, the point on the input and output pulses chosen as a time reference would be of no importance, regardless of the service the delay line is intended to perform. Unfortunately, from a practical viewpoint, the ideal pulse cannot be generated, nor can the delay line exactly reproduce it at its output terminals. In other words, all pulses have finite and decay times. Therefore, the points on the input and output pulses between which time is measured must be compatible with the service the delay line is to perform.

In this vein, Figure 2 illustrates three individual time measurements made on the same delay line—the rise and decay times are exaggerated for emphasis and clearness. The 50% point of the input pulse is used as a reference for the time between the points A and B. The time represented by the points A and C is measured between the 50% points of the input and output pulses. The time measurement between the points B and E is made center-to-center with respect to time of that portion of the input and output pulses above the 50% point of the input pulse. It is readily seen that there is considerable time difference between these measurements. However, each of these measurements is valid provided the proper measurement is associated with the proper delay line usage.

The measurement represented by the points A and B is the correct one if the delay line is to function as a trigger delay, and the circuit being triggered fired at a voltage level equal to the 50% point of the input pulse. The time represented between the points A and C is the correctly measured one if the measurement were in the nature of a video delay measurement. The time between the points D and E would be the correct one if the delay line were to be employed to open a gate circuit and the gated signal was to appear in the center of the gate.

Since the procedure for each measurement is identical, the measurement involving the time spacing between the points A and B is described in detail as being representative of the other measurements which, likewise, may be made.

In the use of the apparatus, the pulse rise time, width and amplitude must be adjusted to be as nearly identical as possible to the actual pulse that will drive the delay line in the circuit for which it is designed. This is necessary since these three quantities have a pronounced effect on the performance of the delay line. If they are badly adjusted, an individual time measurement will be in error by many milli-microseconds.

Figure 3:
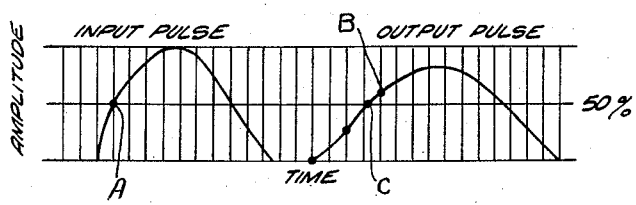
Figure 3 illustrates also a form of presentation produced on the face of the cathode ray tube and is used to describe the method of operating the apparatus illustrated in Figure 1.

Referring to Figure 3 and assuming that the switch arm 31 in Figure 1 engages the stationary contact 29 for observing the input pulse, the apparatus is adjusted as follows. The delay networks 24 and 39 are adjusted until a 1.0 microsecond marker is on a vertical reference line and the 50% point of the leading edge of the input pulse, as shown in Figure 3. Then the switch arm 31 is moved into engagement with the stationary contact 37 to render the output pulse visible. Then the number of 1.0 microsecond markers that appear between the input and output reference points are counted. If the time between these points is greater than the total time represented by the total width of the face of the oscilloscope, the delay means in the channel 23 are adjusted until the output pulse appears on the screen, at the same time counting the one microsecond markers as they pass the vertical reference line. When the last full one microsecond interval has been counted, the switch 15 is manipulated to the 0.1 microsecond position, the 0.1 microsecond marker that corresponds to the last one microsecond marker is identified, and thereafter the number of full 0.1 microsecond markers from this point are counted. Finally, the last 0.1 microsecond marker is aligned with a vertical reference line using the variable element in the network 39, and thereafter the switching means 15 is adjusted to its "off" position and the variable element of the network 40 is adjusted, the dial being moved from zero until the point B moves to the point C on the graticule. A reading is then made directly from the calibrated dial showing the time that is to be added to the last full 0.1 microsecond interval. If the total delay is less than one microsecond, the procedure is as before, but use is made only of the 0.1 microsecond markers and the calibrated delay dial associated with the network 40.

The apparatus may also be used to measure the rise or decay time of a pulse. Generally, the rise or decay time is defined as that time it takes a pulse to vary between its 10% and 90% amplitude points. Since the procedure in measuring decay times is substantially identical to the procedure in measuring rise times, only a rise time measurement is described below.

Figure 4:
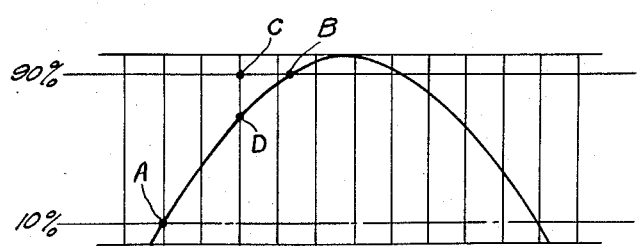
Figure 4 illustrates the manner in which characteristics of individual pulses may be measured, using the apparatus illustrated in Figure 1.

Referring to Figure 4, the presentation shown is made with the delay network 24 and delay network 39 so adjusted that a 0.1 microsecond marker appears on the 10% amplitude point and a vertical reference line on the graticule. This corresponds to point A in Figure 4. Then the number of full 0.1 microsecond intervals between the 10% and 90% amplitude points is counted. Then, using the adjustable element in the delay network 39, the last 0.1 marker is positioned on a vertical reference line corresponding to point B. Then the switching means 15 is switched to its "off" position and the calibrated dial associated with the network 40 is adjusted from its zero position until the point B moves to point C. Then the total time is obtained by adding the time read from the calibrated dial to tht last 0.1 microsecond marker. If the total rise time is less than 0.1 microsecond, the procedure is as before, but use is made only of the calibrated delay dial associated with the network 40.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system for testing delay lines and the like, a source of high frequency oscillations producing oscillations of approximately 10 megacycles, first frequency dividing means coupled to said source for producing oscillations of approximately one megacycle, second frequency dividing means coupled to said first frequency dividing means and producing oscillations of approximately 10,000 cycles, an oscillograph having beam deflecting means, intensity control means and sweep synchronizing means, a single pole three position switch having a first 0.1 microsecond position, a second 1.0 microsecond position and an "off" position for selectively connecting and disconnecting the output of said source and said first frequency dividing means to and from said intensity control means, a synch pulse channel coupled between said second frequency dividing means and said sweep synchronizing means and incorporating means for developing pulses in timed relationship with said oscillations, said synch pulse channel incorporating a pair of delay means for varying the pulse transmitted therethrough from approximately zero to 50 microseconds, a test pulse channel coupled between said second frequency dividing means and said beam deflecting means and incorporating means for developing pulses in timed relationship with said oscillations, said test pulse channel incorporating delay means for varying the pulse transmitted therethrough from approximately zero to 50 microseconds.

2. A system as set forth in claim 1 including a delay line having an input terminal and an output terminal, said test pulse channel being connected to said input channel, and switching means for selectively connecting said beam deflecting means to either said input terminal or to said output terminal.

References Cited in the file of this patent

UNITED STATES PATENTS

| | | |
|---|---|---|
| 2,414,477 | Meacham | Jan. 21, 1947 |
| 2,477,615 | Isbister | Aug. 2, 1949 |
| 2,504,852 | Lewis | Apr. 18, 1950 |
| 2,546,814 | Augustadt | Mar. 27, 1951 |
| 2,595,263 | Ingalls | May 6, 1952 |
| 2,695,997 | Mountjoy et al. | Nov. 30, 1954 |
| 2,763,835 | Lundgren | Sept. 18, 1956 |